United States Patent
Nguyen et al.

(10) Patent No.: US 10,162,083 B2
(45) Date of Patent: Dec. 25, 2018

(54) TRANSPARENT BUFFER LAYER FOR MAINTAINING COATED GLASS BEND STRENGTH

(71) Applicant: Apple Inc., Cupertino, CA (US)

(72) Inventors: Que Anh S. Nguyen, San Jose, CA (US); Matthew S. Rogers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/275,140

(22) Filed: Sep. 23, 2016

(65) Prior Publication Data

US 2017/0082781 A1    Mar. 23, 2017

Related U.S. Application Data

(60) Provisional application No. 62/222,685, filed on Sep. 23, 2015.

(51) Int. Cl.
| G02B 1/115 | (2015.01) |
| G02B 1/12 | (2006.01) |
| G02B 1/14 | (2015.01) |

(52) U.S. Cl.
CPC .............. *G02B 1/115* (2013.01); *G02B 1/12* (2013.01); *G02B 1/14* (2015.01)

(58) Field of Classification Search
CPC .......... G02B 5/20; G02B 5/207; G02B 5/208; G02B 1/11; G02B 1/12; G02B 1/14; G02B 1/115
USPC .............. 359/350, 355, 359, 361, 601, 609; 427/162, 164–168
See application file for complete search history.

(56) References Cited

U.S. PATENT DOCUMENTS

| 6,361,101 | B1 | 3/2002 | Yoshizawa |
| 6,875,467 | B2 | 4/2005 | Sigoli et al. |
| 6,926,592 | B2 | 8/2005 | Brandes |
| 2012/0009392 | A1* | 1/2012 | Chou .................... G02B 1/105 428/192 |
| 2017/0247290 | A1* | 8/2017 | Oudard ............... C03C 17/3417 |

* cited by examiner

*Primary Examiner* — Robert E Tallman
(74) *Attorney, Agent, or Firm* — Kendall W. Abbasi

(57) ABSTRACT

Methods and systems for depositing a thin film are disclosed. The methods and systems can be used to deposit a film having a uniform thickness on a substrate surface that has a non-planar three-dimensional geometry, such as a curved surface. The methods involve the use of a deposition source that has a shape in accordance with the non-planar three-dimensional geometry of the substrate surface. In some embodiments, multiple layers of films are deposited onto each other forming multi-layered coatings. In some embodiments, the multi-layered coatings are antireflective (AR) coatings for windows or lenses.

14 Claims, 7 Drawing Sheets

TRANSPARENT BUFFER LAYER FOR MAINTAINING COATED GLASS BEND STRENGTH

CROSS-REFERENCE TO RELATED APPLICATIONS

This application claims the benefit of U.S. Provisional Application No. 62/222,685, filed Sep. 23, 2015, entitled "TRANSPARENT BUFFER LAYER FOR MAINTAINING COATED GLASS BEND STRENGTH", which is incorporated by reference herein in its entirety.

FIELD

This disclosure relates generally to coatings applied to a glass substrate and methods for forming the same. In particular embodiments, systems and methods for forming an optically clear buffer layer between a glass substrate and a deposited over layer that maintains a glass strength by prevents stress accumulations crack propagation.

BACKGROUND

Coatings (such as anti-reflective) are generally applied to surfaces of glass substrates in the form of lenses or windows to provide a protective layer as well as in some instances reduce the reflection of light incident on the surfaces that can cause glare. Typically, the coatings are thin films structures that are applied to surfaces using deposition techniques such as sputter deposition, chemical vapor deposition (CVD) and plasma enhanced chemical vapor deposition (PECVD) processes. In some cases, the coatings include multiple alternating layers of thin films, which provide materials of different refractive indexes and that improve the anti-reflective qualities of the coatings.

SUMMARY

This paper describes various embodiments that relate to coatings and methods for forming the same. In particular, the coatings represent a buffer layer deposited on a glass substrate that prevents propagation of a crack formed at an outer layer caused by a bending event.

Some embodiments can include a method including forming a buffer layer using a first deposition process that conformably coats a curved surface of an optically clear substrate with an amount of buffer layer material, the buffer layer comprising optical characteristics that are compatible with the optically clear substrate, and at least a central portion having a generally uniform central region thickness. The method can further include forming a protective layer using a second deposition process that conformably coats the buffer layer with an amount of protective layer material, wherein the buffer layer is generally unaffected by the second deposition process and wherein the buffer layer prevents a crack formed in the protective layer from reaching the optically clear substrate.

Some embodiments can include an electronic device including a housing having walls with edges that define an opening and a multi-layer optical assembly carried by the housing at the edges within the opening. The multi-layer optical assembly can include an optically clear substrate, a buffer layer having optical characteristics that are compatible with the optically clear substrate, wherein the buffer layer is adhered to and conformably coats a curved surface of the optically clear substrate, the buffer layer having a central region characterized as having a generally uniform thickness, and a protective layer that conformably coats the buffer layer, wherein the buffer layer prevents a crack formed in the protective layer from reaching the optically clear substrate.

Some embodiments can include a glass assembly including a glass substrate having a curved geometry, an optically clear buffer layer overlaying the glass substrate, the optically clear buffer layer characterized as having a central region having a generally uniform thickness, and an optically clear outer layer overlaying and adhering to the optically clear buffer layer and characterized as having an anti-reflective property, where the optically clear buffer layer is formed of a material that limits propagation of a crack formed in the protective layer to the buffer layer.

These and other embodiments will be described in greater detail below.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
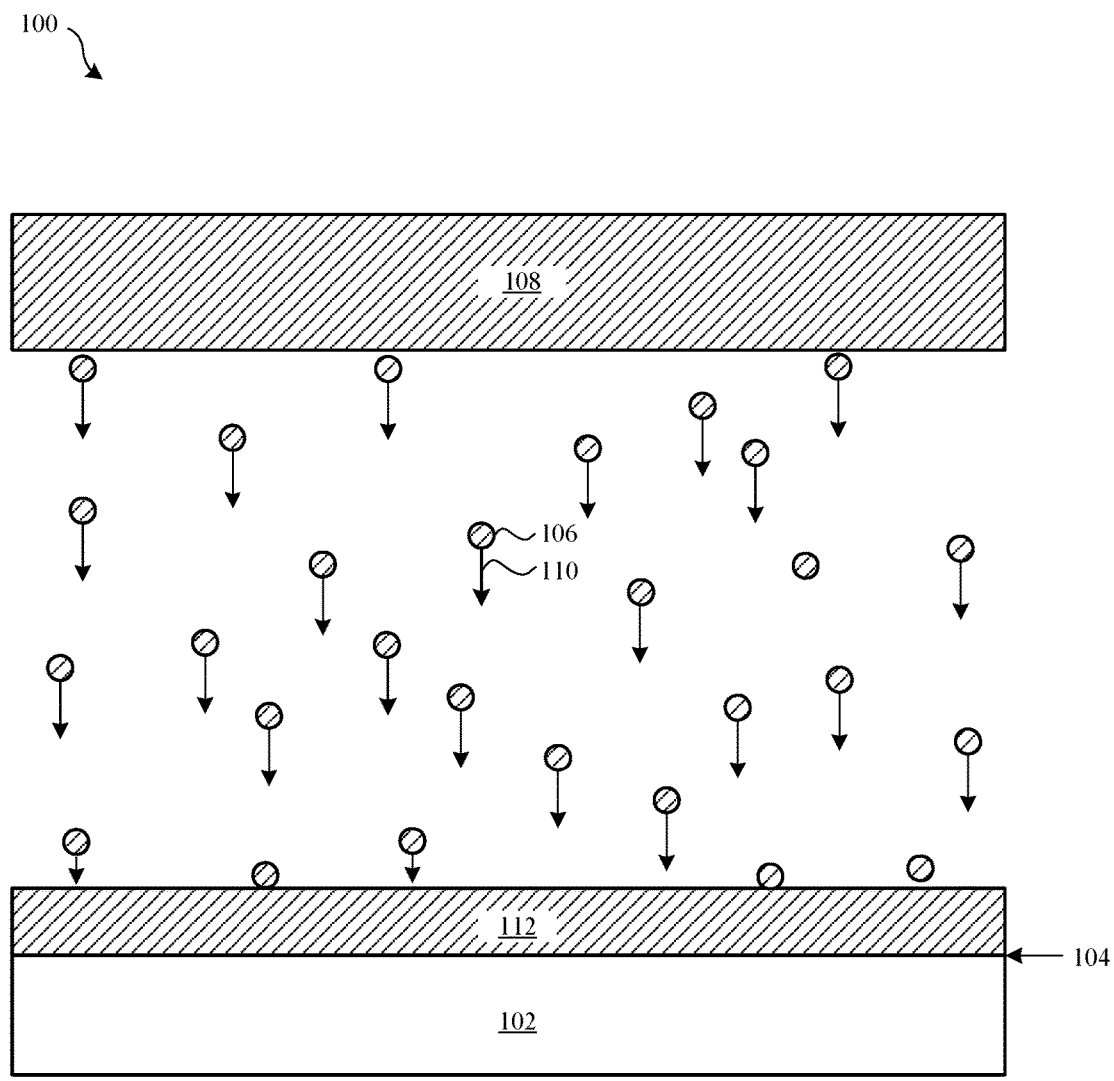
FIG. 1A shows a schematic view of a conventional deposition system used to deposit a film on a planar surface.

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

Described herein are methods and systems for depositing a thin film on a glass substrate surface. In one embodiment, the thin film can take the form of a buffer layer well suited to prevent stress and cracks from propagating through the buffer layer. The thin film can conformably coat the glass substrate surface and has a substantially uniform thickness. The thin film can have a thickness on the order of about 2 microns but can range as low as about 250 nm and a high as tens of microns. The thin film can form a buffer layer between an outer layer and the glass substrate. The outer layer can take the form of an outer protective layer. In some embodiments, the assembly of the glass substrate, buffer layer, and outer layer can have a curved geometry. In some embodiments, the buffer layer can be formed of optically transparent material such as optically clear photoresist. In some embodiments, the buffer layer can be formed of a fluoride-based material. In some embodiments, the assembly of the glass substrate can include multi-layered coatings at least one of which can be an antireflective (AR) coating suitable for optical applications such as windows or lenses. According to some embodiments, the outer layer can be formed using a sputtering system is used and the deposition source corresponds to a sputter target. According to other embodiments, a plasma enhanced chemical vapor deposition (PECVD) system or a pressure vapor deposition (PVD) can be used. In this regard, the buffer layer can be formed of a material that can be substantially unaffected by the deposition process used to form the outer layer.

Methods described herein are well suited for providing coatings on surfaces of a glass substrate. For example, the methods described herein can be used to form durable layer for portions of computers, portable electronic devices and electronic device accessories, such as those manufactured by Apple Inc., based in Cupertino, Calif. In some embodiments, the methods described herein can be used to form coatings on curved surfaces, such as curved windows or lenses of consumer electronic devices.

More specifically, embodiments can include a method including forming a buffer layer using a first deposition process that conformably coats a curved surface of an optically clear substrate with an amount of buffer layer material, the buffer layer comprising optical characteristics that are compatible with the optically clear substrate, and at least a central portion having a generally uniform central region thickness. The method can further include forming a protective layer using a second deposition process that conformably coats the buffer layer with an amount of protective layer material, wherein the buffer layer is generally unaffected by the second deposition process and wherein the buffer layer prevents a crack formed in the protective layer from reaching the optically clear substrate.

In some embodiments the buffer layer can include a peripheral region that at least partially surrounds the central region, the peripheral region having a peripheral region thickness that is different than the central region thickness. In some embodiments the peripheral region is formed using a modified first process that coats a corresponding portion of the optically clear substrate with a modified amount of the buffer material. In some embodiments the peripheral region thickness is greater than the central region thickness. In some embodiments the buffer layer material comprises an optically clear photoresist. In some embodiments the first deposition process is one of a spin coat process, a pressure vapor deposition (PVD) process, or an ink jet deposition process, and wherein the second deposition process is one of a spin coat process, a pressure vapor deposition (PVD) process, or an ink jet deposition process. In some embodiments at least the central region thickness is about 2 microns. In some embodiments the protective layer material is characterized as having an anti-reflective property.

Some embodiments can include an electronic device including a housing having walls with edges that define an opening and a multi-layer optical assembly carried by the housing at the edges within the opening. The multi-layer optical assembly can include an optically clear substrate, a buffer layer having optical characteristics that are compatible with the optically clear substrate, wherein the buffer layer is adhered to and conformably coats a curved surface of the optically clear substrate, the buffer layer having a central region characterized as having a generally uniform thickness, and a protective layer that conformably coats the buffer layer, wherein the buffer layer prevents a crack formed in the protective layer from reaching the optically clear substrate.

In some embodiments the buffer layer is generally unaffected by a process used to form the protective layer. In some embodiments the buffer layer can include a peripheral region that at least partially surrounds the central region. In some embodiments a thickness of the peripheral region is different than the thickness of the central region. In some embodiments the buffer layer is formed of an optically clear photoresist. In some embodiments the protective layer is characterized as having an anti-reflective property. In some embodiments the generally uniform thickness of the central region is at least 250 nm.

Some embodiments can include a glass assembly including a glass substrate having a curved geometry, an optically clear buffer layer overlaying the glass substrate, the optically clear buffer layer characterized as having a central region having a generally uniform thickness, and an optically clear outer layer overlaying and adhering to the optically clear buffer layer and characterized as having an anti-reflective property, where the optically clear buffer layer is formed of a material that limits propagation of a crack formed in the protective layer to the buffer layer.

In some embodiments the optically clear buffer layer further comprises a peripheral region that surrounds the central region and has a thickness that is different than the central region. In some embodiments the optically clear buffer layer comprises a fluoride based material. In some embodiments the optically clear buffer layer has a thickness of at least 2 microns. In some embodiments the optically clear buffer layer is an optically transparent photoresist.

These and other embodiments are discussed below with reference to FIGS. 1A-6. However, those skilled in the art will readily appreciate that the detailed description given herein with respect to these Figures is for explanatory purposes only and should not be construed as limiting.

As described above, conventional methods for forming coatings are designed for forming the coatings on flat or planar surfaces. FIG. 1A shows a schematic view of system 100 used to deposit a coating on a planar surface using a conventional thin film deposition technique. During a deposition process, substrate 102 is positioned within deposition system 100. Deposition system 100 can correspond to, for example, a sputter deposition system or a chemical vapor deposition (CVD) system, such as plasma enhanced chemical vapor deposition (PECVD) system, or pressure vapor deposition (PVD) system. Substrate 102 has surface 104 that are substantially flat or planar in shape. Particles 106 from source 108 move toward and deposit onto surface 104 of substrate 102 as layer 112. Arrows 110 can indicate a general direction in which particles 106 move toward substrate 102 during a deposition process. As shown, particles 106 move primarily in a substantially perpendicular direction with respect to surface 104.

In cases where system 100 is a sputter deposition system, source 108 corresponds to a sputter target from which particles 106 are sputtered. In cases where system 100 is a CVD system, source 108 corresponds to a source of volatile material or precursor material that flows toward and deposits onto surface 104. Using system 100, layer 112 can be deposited on surface 104 uniformly. That is, the thickness of layer 112 can be about the same across surface 104.

Figure 1B:
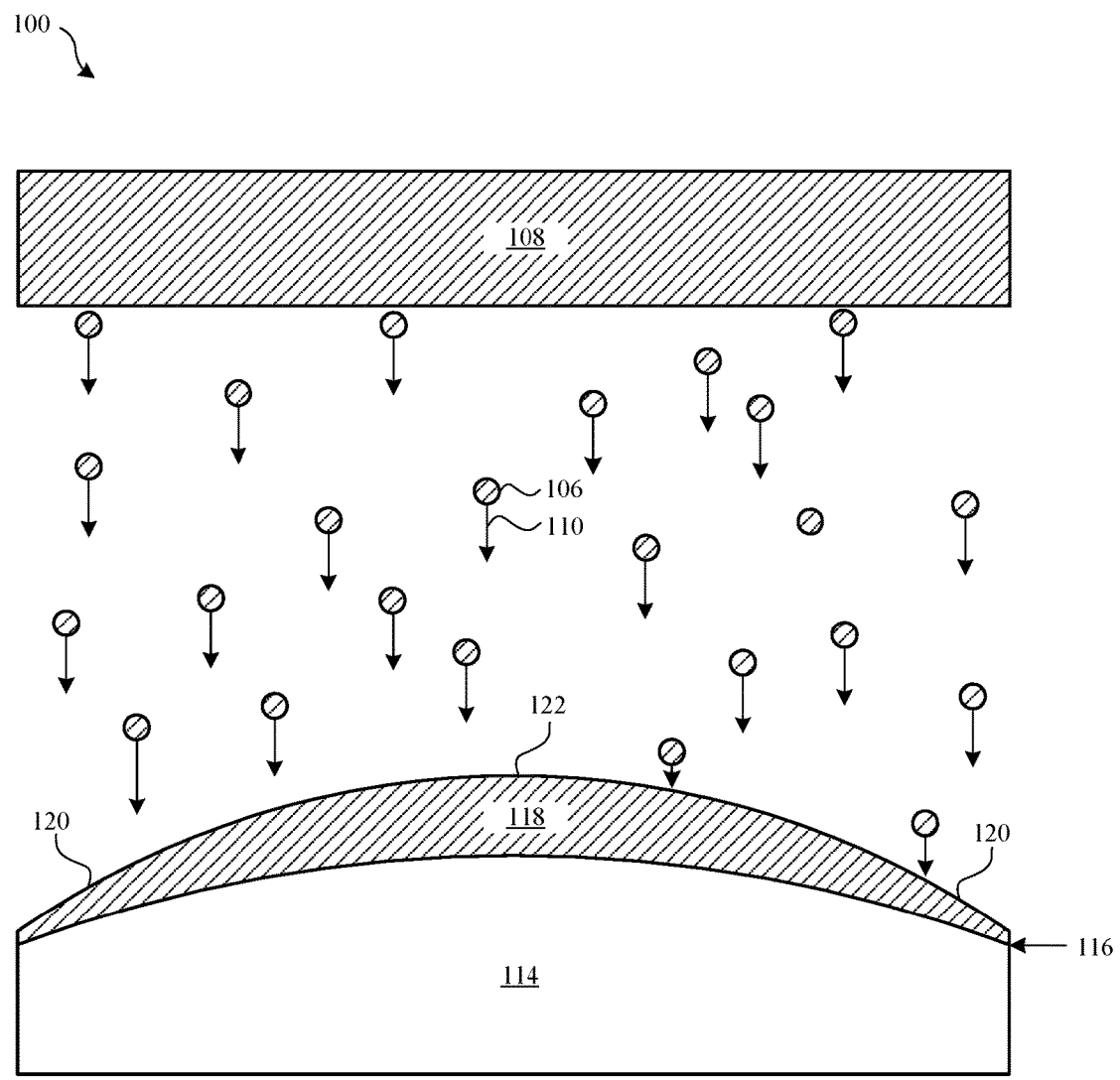
FIG. 1B shows the conventional deposition system of FIG. 1A used to deposit a film on a non-planar surface.

FIG. 1B shows system 100 used to deposit a film on a non-planar surface. Substrate 114 includes surface 116 having a non-planar shape. A non-planar surface is a surface having a three-dimensional geometry or topography that is not substantially planar. Surface 116, in particular, has a curved shape. During a deposition process, particles 106 move toward and deposit onto surface 116 as film 118. As shown, particles 106 move substantially in the same direction with respect to each other, as indicated by arrows 110. Since surface 116 is curved, some particles 106 do not deposit onto surface 116 at a perpendicular direction, particularly at peripheral portions 120. As a result, film 118 is deposited more thinly at peripheral portions 120 compared to central portion 122. Thus, film 118 has a non-uniform thickness. If film 118 is an AR coating, this means that central portion 122 will function differently than peripheral portions 120 with respect to anti-reflective effectiveness. For example, central portion 122 may work more effectively than peripheral portions 120 with respect to anti-reflective effectiveness. If the deposition process is tuned to deposit more material onto peripheral portions 120, central portion 122 will be deposited on too thickly. This can result in peripheral portions 120 of film 118 being more effective than central portion 122 with respect to providing anti-reflective functionality. In addition to reduced anti-reflective functionality, portions of film 118 that are too thick or too thin can take on a color or hue rather than being fully transparent, which can be undesirable in many applications. If multiple layers of film (not shown) are deposited to form the final AR coating, this non-uniformity can be exacerbated resulting in even more disparity between thicknesses of peripheral portions 120 compared to central portion 122. However, in some cases it can be desirable to control a thickness of film 118. For example, controlling the thickness of film 118 such that peripheral portion 120 is at least about equal thickness or thicker than central portion 122 can have desirable optical effects.

Figure 2:
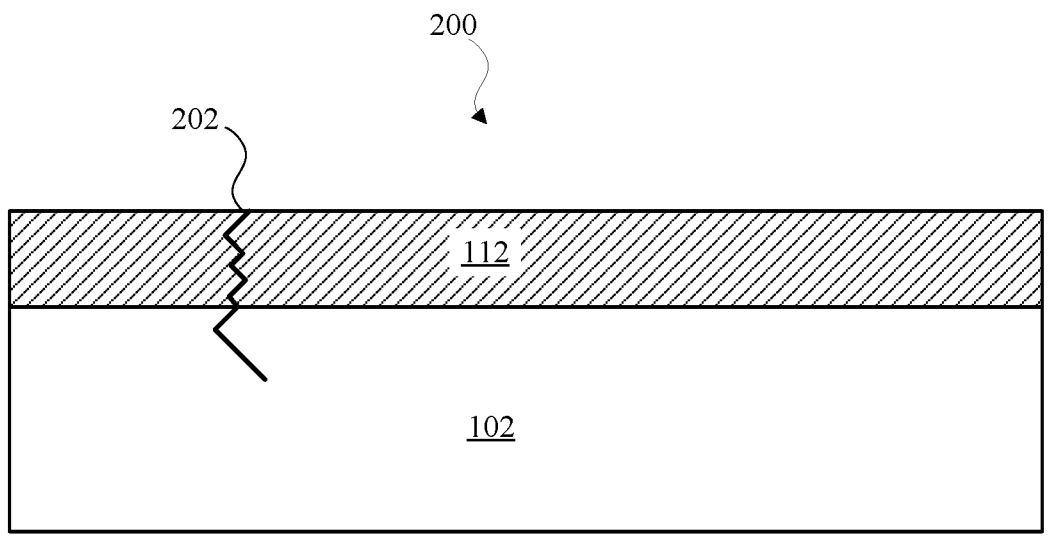
FIG. 2 shows a conventional glass assembly.

FIG. 2 shows conventional glass assembly 200 illustrating that in an absence of a buffer layer between layer 112 and substrate 102, crack 202 can form at layer 112 and propagate through layer 112 and enter substrate 102. In this way, the strength of substrate 102 can be substantially reduced (by as much as 50%) as compared to an initial strength prior to deposition of layer 112. This is particularly relevant when glass assembly 200 is bent or otherwise is exposed to an external event that can cause stress accumulation(s) within layer 112.

Figure 3:
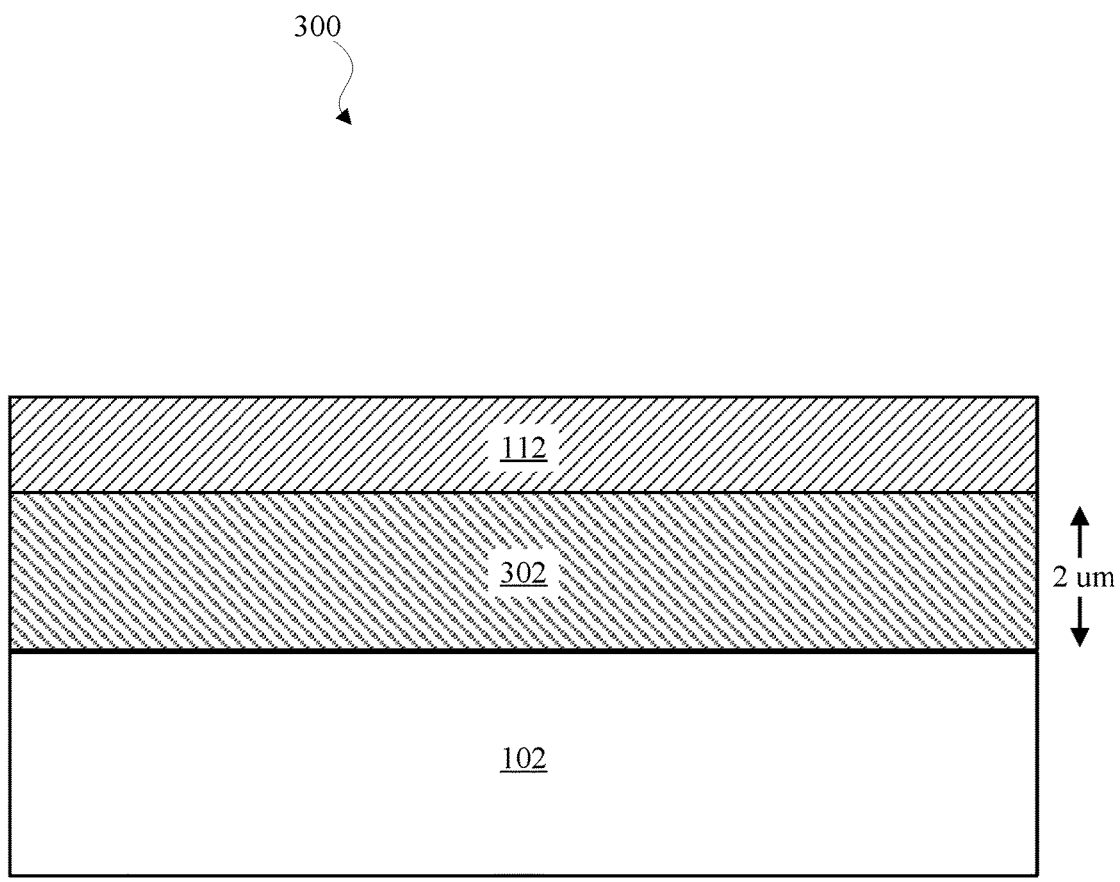
FIG. 3 shows a glass assembly having a buffer layer in accordance with the described embodiments.

FIG. 3 shows glass assembly 300 in accordance with the described embodiments. Glass assembly 300 can include glass substrate 102 overlaid by optically transparent buffer layer 302. In the described embodiment, optically transparent buffer layer 302 can have a uniform thickness of about 2 microns. However, the range of thickness for buffer layer 302 can extend from about 250 nm to tens of microns. In any case, buffer layer 302 can be formed of material having a good adhesion to both glass substrate 102 and layer 112 as well as be able to withstand adverse modification by the process used in the formation of layer 112 (which is generally formed using a deposition process, such as PVD). In one embodiment, buffer layer 302 can be formed of optically clear photoresist. In one embodiment, buffer layer 302 can be formed of a fluoride-based material. In any case, the adhesive properties and the ability to withstand a subsequent deposition process as well as being optically transparent provides limitation of materials that are well suited for use to form layer 112. The ability to withstand a subsequent deposition process can mean that the buffer layer material is non-reactive or is not otherwise adversely affected by a subsequent deposition process other than the subsequent deposition process can result in an outer layer being deposited onto the buffer layer.

Figure 4:
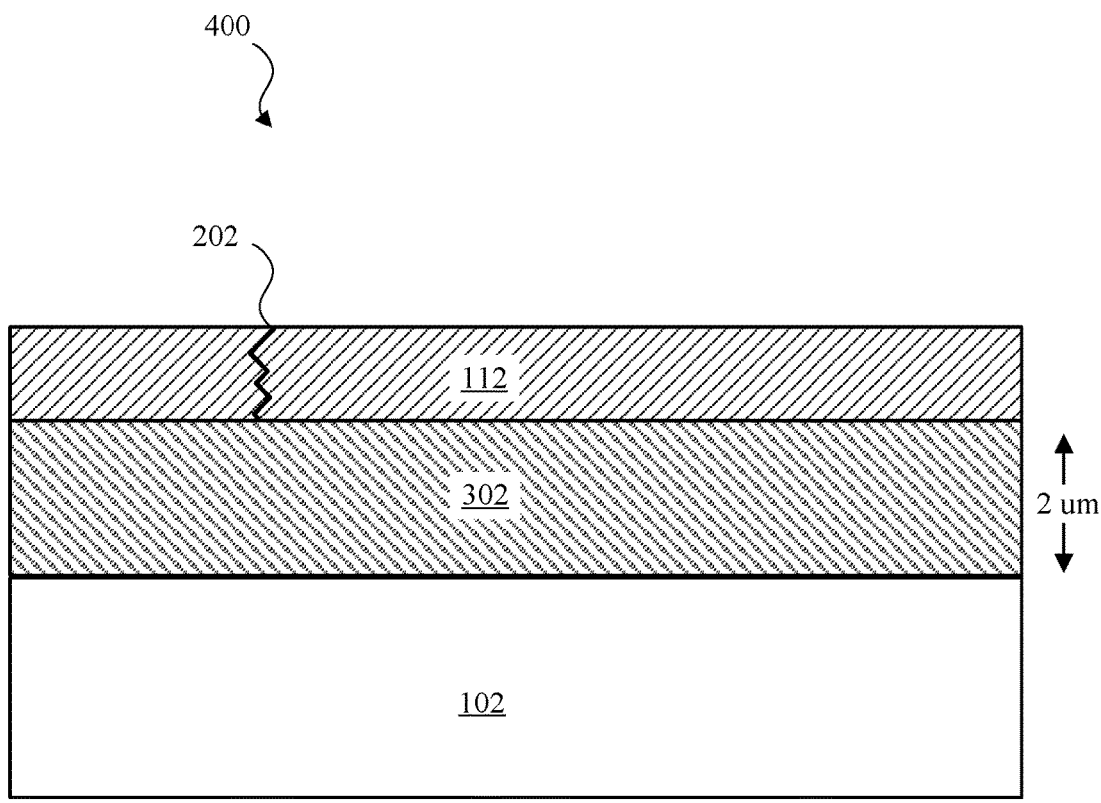
FIG. 4 illustrates the glass assembly of FIG. 3 where the buffer layer prevents propagation of a crack.

FIG. 4 illustrates glass assembly 400 having crack 202 initiating in layer 112 and propagating to a boundary between layer 112 and buffer layer 302 where crack 202 is prevented from further propagation. In this way, buffer layer 302 prevents further propagation of cracks that have initiated in layer 112 to glass substrate 102 thereby allowing glass substrate 102 to maintain an original strength.

Figure 5A:
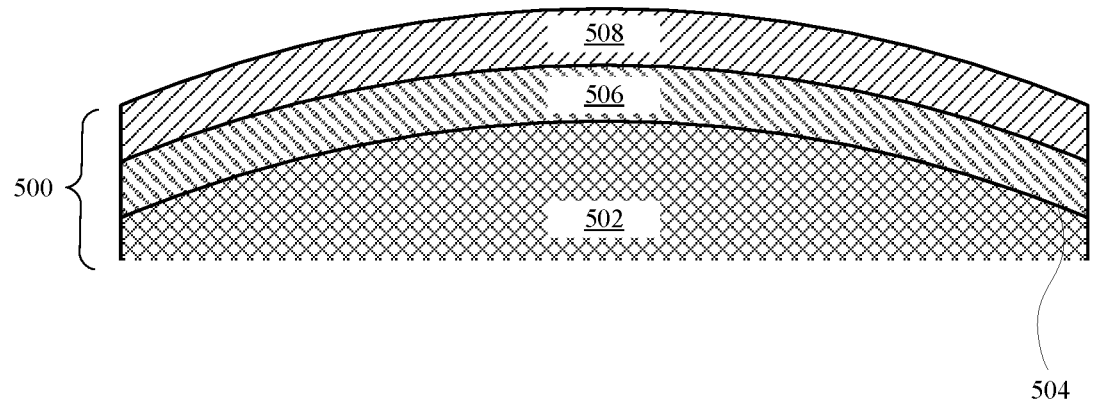
FIG. 5A shows a curved glass assembly in accordance with the described embodiments.
Figure 5B:
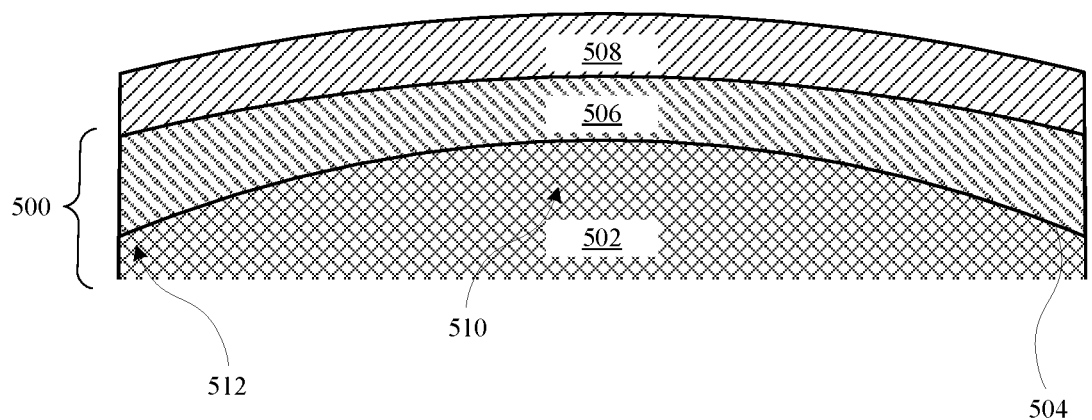
FIG. 5B shows a curved glass assembly having an alternatively configured buffer layer in accordance with the described embodiments.

FIG. 5A shows curved glass assembly 500 in accordance with the described embodiments. Curved glass assembly includes glass substrate 502 having a curved surface 504, buffer layer 506 that conforms to curved surface 504, and film 508 that overlays buffer layer 506. As shown, buffer layer 506 can have a generally uniform thickness. In some embodiments, as illustrated in a FIG. 5A, buffer layer 506 can have a more general uniform thickness across a central portion 510 and can have a greater thickness at a peripheral portion 512 of the curved surface 504. The uniformity of thickness of the buffer layer 506 at the peripheral portion 512 of the curved surface 504, or greater thickness, provides several advantages including visual uniformity of the buffer layer 506 as well as better protection from potential crack propagation at the peripheral portion 512 of the buffer layer 506.

Figure 6:
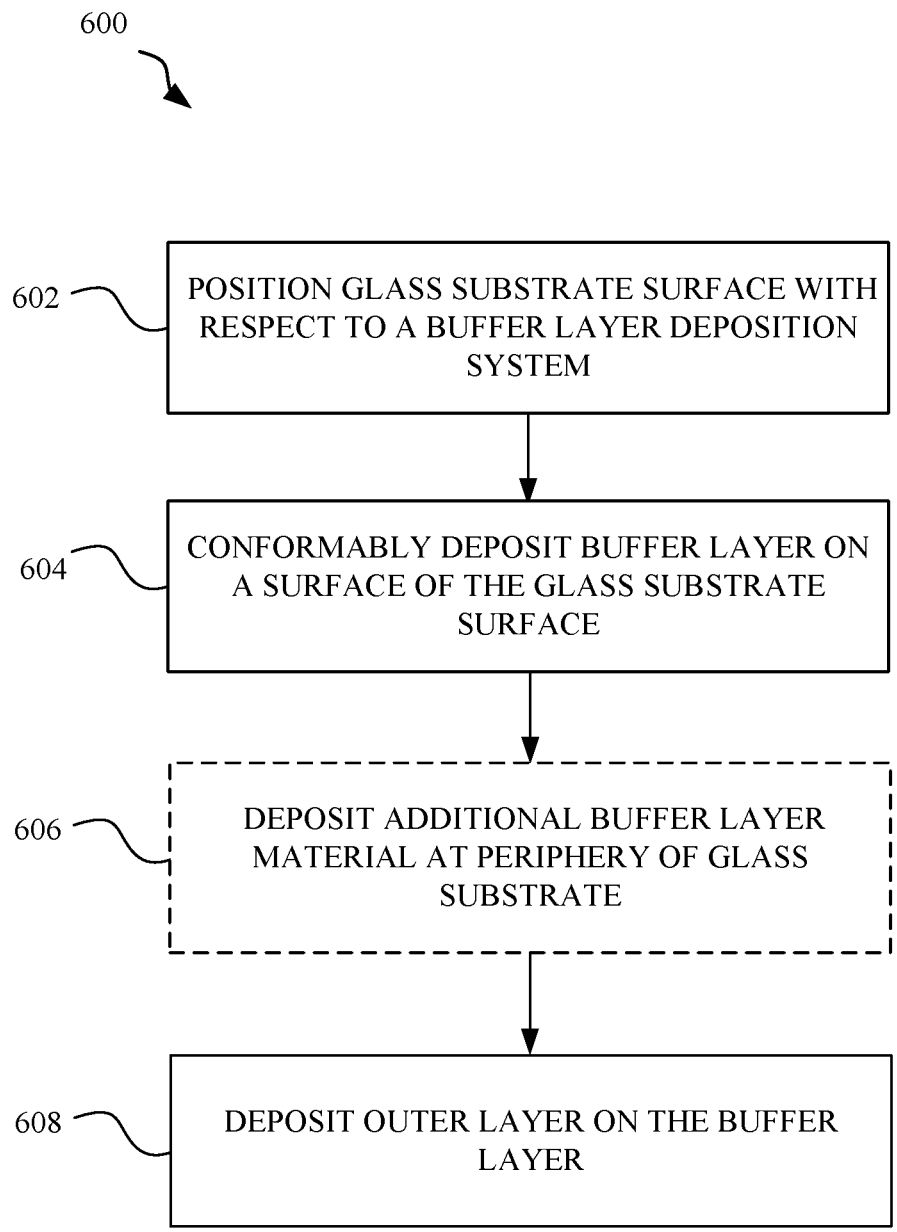
FIG. 6 shows a flowchart that indicates a process for depositing a film on a surface of a substrate in accordance with described embodiments.

FIG. 6 shows flowchart detailing process 600 in accordance with the described embodiments. At 602, a glass substrate surface is positioned with respect to a source of a buffer layer deposition system. In some embodiments, the buffer layer is formed of an optically clear photo-resist in which case, the buffer layer deposition system includes a photo-resist deposit mechanisms such a ink-jet printing, spray, spin coat, and so on. At 604, a buffer layer is deposited on a surface of the glass substrate in a conforming manner. The buffer layer is deposited in a manner such that the buffer layer has a generally uniform thickness across the entire surface of the glass substrate. In some embodiment, in an optional step at 604, buffer layer material can be deposited at the peripheral portion of the glass surface such that the thickness of the buffer layer is greater than at the central portion of the glass surface. The deposition of buffer layer material at the peripheral portion to obtain the uniform thickness or the greater thickness can be achieved by biasing the photo-resist deposit machine to deposit more material at the periphery of the glass surface until the desire thickness is achieved. Depositing the material can be done in a variety of ways. In some embodiments, such as in ink-jet printing and spray deposition, and when a nozzle is used, the nozzle can make deposition passes across the glass surface. To deposit additional material at the peripheral portion of the glass surface, the nozzle can make multiple passes, eject material at a greater rate and/or move more slowly over the periphery, among numerous other methods for depositing the additional material at the peripheral portion of the glass surface. At 606, an outer layer, or film, is deposited on the buffer layer using a deposition source. In one embodiment, the outer layer can be deposited on the buffer layer using well-known deposition processes, such as PVD. The source can be any suitable deposition source. In one embodiment, the glass substrate can have a non-planar, or curved, surface. In some embodiments, the substrate is supported and/or positioned using a support. In some embodiments the support includes a translational mechanism configured to translate the substrate with respect to the source. In some embodiments, the translational mechanism is configured to translate the substrate before and after a deposition process. In some embodiments, the translational mechanism is configured to additionally translate the substrate during one or more deposition processes.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method, comprising:
    forming a buffer layer using a photoresist deposition process that conformably coats a curved surface of an optically clear substrate with an amount of optically clear buffer layer material, the buffer layer comprising a central portion having a first thickness and an edge portion having a second thickness, wherein the second thickness is equal to the first thickness; and
    forming a protective layer using a plasma vapor deposition process that conformably coats the buffer layer with an amount of protective layer material, wherein the buffer layer is non-reactive to the plasma vapor deposition process and wherein the buffer layer protects the optically clear substrate.

2. The method as recited in claim 1, wherein the peripheral region is formed using a modified photoresist process that coats a corresponding portion of the optically clear substrate with a modified amount of the optically clear buffer layer material.

3. The method as recited in claim 1, wherein the optically clear buffer layer material comprises an optically clear photoresist.

4. The method as recited in claim 1, wherein at least the first thickness is about 2 microns.

5. The method as recited in claim 1, wherein the protective layer material is characterized as having an anti-reflective property.

6. An electronic device, comprising:
    a housing having walls with edges that define an opening; and
    a multi-layer optical assembly carried by the housing at the edges within the opening, the multi-layer optical assembly comprising:
        an optically clear substrate,
        a buffer layer comprising optically clear material, wherein the buffer layer is adhered to and conformably coats a curved surface of the optically clear substrate, the buffer layer having first and second opposing edges and a uniform thickness from the first edge to the second edge, and
    a protective layer that conformably coats the buffer layer, wherein the buffer layer protects the optically clear substrate.

7. The electronic device of claim 6, wherein the buffer layer is non-reactive to a process used to form the protective layer.

8. The electronic device of claim 6, the buffer layer further comprising a peripheral region that at least partially surrounds the central region.

9. The electronic device of claim 6, wherein the optically clear material comprises an optically clear photoresist.

10. The electronic device of claim 6, wherein the protective layer is characterized as having an anti-reflective property.

11. The electronic device of claim 6, wherein the uniform thickness of the buffer layer is at least 250 nm.

12. A glass assembly, comprising:
    a glass substrate having a curved geometry;
    an optically clear buffer layer overlaying the glass substrate, the optically clear buffer layer characterized as having a central region having a generally uniform thickness and wherein the optically clear buffer layer comprises a fluoride based material; and
    an optically clear outer layer overlaying and adhering to the optically clear buffer layer and characterized as having an anti-reflective property, wherein the optically clear buffer layer is formed of a material that limits propagation of a crack formed in the protective layer to the buffer layer.

13. The glass assembly as recited in claim 12, wherein the optically clear buffer layer further comprises a peripheral region that surrounds the central region and has a thickness that is different than the central region.

14. The glass assembly as recited in claim 12, wherein the optically clear buffer layer has a thickness of at least 2 microns.

* * * * *